(12) United States Patent
Ali et al.

(10) Patent No.: US 11,650,975 B2
(45) Date of Patent: May 16, 2023

(54) ONLINE FILE SYSTEM CONSISTENCY CHECK FOR CONTAINER DATA ON A CLUSTERED FILESYSTEM

(71) Applicant: International Business Machines Corporation, Armonk, NY (US)

(72) Inventors: Asmahan Ali, Poughkeepsie, NY (US); Christina Lara, Tucson, AZ (US); Abhishek Jain, Baraut (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 17/119,009

(22) Filed: Dec. 11, 2020

(65) Prior Publication Data

US 2022/0188289 A1    Jun. 16, 2022

(51) Int. Cl.
*G06F 16/23* (2019.01)
*G06F 16/182* (2019.01)

(52) U.S. Cl.
CPC ........ *G06F 16/2365* (2019.01); *G06F 16/182* (2019.01)

(58) Field of Classification Search
CPC ........................... G06F 16/2365; G06F 16/182
USPC ........................................................ 707/690
See application file for complete search history.

(56) References Cited

U.S. PATENT DOCUMENTS

| | | | |
|---|---|---|---|
| 7,730,090 B2 | 6/2010 | Godbole | |
| 8,301,673 B2 | 10/2012 | Hyer, Jr. et al. | |
| 8,600,953 B1 | 12/2013 | Gerber | |
| 9,223,788 B2 | 12/2015 | Ranade et al. | |
| 10,079,850 B1* | 9/2018 | Patil | G06F 21/577 |
| 2001/0039579 A1* | 11/2001 | Trcka | G06F 21/552 |
| | | | 709/224 |
| 2004/0077090 A1* | 4/2004 | Short | C12N 15/1027 |
| | | | 435/254.2 |

(Continued)

FOREIGN PATENT DOCUMENTS

EP         1594062 A2    11/2005
WO    2010050944 A1     5/2010

OTHER PUBLICATIONS

"Filesystems: A Brief Introduction," Linux filesystems: definition, structure, selection, optimization, Date Accessed: Oct. 20, 2020 pp. 1-8 http://www.linfo.org/filesystem.html.

(Continued)

*Primary Examiner* — Pierre M Vital
*Assistant Examiner* — Fariborz Khoshnoodi
(74) *Attorney, Agent, or Firm* — Patterson + Sheridan, LLP

(57) ABSTRACT

Online file system consistency check for container data on a clustered file system is provided via identifying inodes (index nodes) of a group of files in a clustered file system based on a cyber-resiliency for the clustered file system; grouping the inodes based on a buffer size allocated to a FSCK (File System Consistency Check) operation; passing the inodes of to the FSCK operation in a single iteration when a total size of the inodes is less than the buffer size; or when the total size of the inodes is greater than the buffer size, identifying inodes that belong to a first container and that belong to a second container; passing the inodes that belong to the first container to the FSCK operation in a first iteration; and passing, after the first iteration completes, the inodes that belong to the second container to the FSCK operation in a second iteration.

20 Claims, 7 Drawing Sheets

(56) References Cited

U.S. PATENT DOCUMENTS

| | | | |
|---|---|---|---|
| 2008/0027905 A1* | 1/2008 | Jensen | G06F 3/0613 |
| 2009/0193486 A1* | 7/2009 | Patel | H04N 21/42661 |
| | | | 725/114 |
| 2009/0217377 A1* | 8/2009 | Arbaugh | G06F 11/3495 |
| | | | 726/23 |
| 2009/0248863 A1* | 10/2009 | Uyama | G06Q 10/04 |
| | | | 709/224 |
| 2010/0076965 A1* | 3/2010 | Kamada | G06F 16/9535 |
| | | | 707/728 |
| 2013/0275390 A1* | 10/2013 | Ozzie | G06F 11/1004 |
| | | | 707/687 |
| 2014/0150050 A1* | 5/2014 | Lotem | H04L 63/0263 |
| | | | 726/1 |
| 2015/0169612 A1* | 6/2015 | Kashyap | G06F 3/0605 |
| | | | 707/692 |
| 2016/0226904 A1* | 8/2016 | Bartos | G06F 21/566 |
| 2018/0278425 A1* | 9/2018 | Xu | H04L 9/12 |
| 2018/0293265 A1 | 10/2018 | Eda et al. | |
| 2020/0193013 A1* | 6/2020 | Hong | G06F 21/577 |
| 2020/0201842 A1 | 6/2020 | Patel et al. | |
| 2021/0117406 A1* | 4/2021 | Burkule | H04L 67/1095 |
| 2021/0224232 A1* | 7/2021 | Dalmatov | G06F 16/185 |

OTHER PUBLICATIONS

"What is metadata, and how does it aid in the "fsck" process?" Unix & Linux Stack Exchange, Dated: Jan. 1, 1959, pp. 1-6 http://unix.stackexchange.com/questions/23252/what-is-metadata-and-how-does-it-aid-in-the-fsck-process.

"Cyber Resilience," Wikipedia, Date Accessed: Oct. 20, 2020 pp. 1-4, https://en.wikipedia.org/wiki/Cyber_resilience.

* cited by examiner

ONLINE FILE SYSTEM CONSISTENCY CHECK FOR CONTAINER DATA ON A CLUSTERED FILESYSTEM

BACKGROUND

The present invention relates to an effective mechanism to perform online File System Check (FSCK) operations, and more specifically, to an improved mechanism for ensuring the consistency of clustered file systems to provide greater system uptime, among other benefits.

In UNIX and UNIX-like file systems, an inode is a data structure that describes a file system object, such as a file or a directory. Each inode contains information or metadata related to the object, such as: the owner and group associated with the object, the object type (e.g., whether the object is a regular file or a directory), the object's permissions, the creation/access/modification times, the size of the object (e.g., X bytes), and the disk address the holds the actual user data. Ensuring metadata consistency is crucial when accessing (reading and/or writing) these user data. The file system internal data structure and reserved/hidden status of inodes are other examples of metadata that help the file system daemon maintain a clustered file system. The consistency of these inodes is necessary to mount the file system and make data available to users and applications. However, corruption in file system or user file metadata can disrupt this consistency. Corruption can occur due to various reasons, for example: disk subsystem problems, a code bug in the file system daemon when recovering a failing node in a clustered environment, etc.

In a clustered file system environment, it is generally desirable to keep the file system online all the time in order to serve user applications seemingly. To achieve high availability, the administrator needs to perform regular online maintenance activity such as FSCK operations to identify/fix corrupted files. Usually, the file system manager node takes the responsibility of managing file system maintenance operations (such as FSCK). Some clustered file systems distribute maintenance workload (i.e., FSCK) to all cluster nodes. Traditionally, a FSCK operation consists of reading all the inodes, checking the consistency of these inodes, evaluating the corruption (if any), and attempting to fix as many corruption issues as possible. Various file system consistency issues and the associated corrective actions performed by a FSCK operation can include, for example: blocks marked allocated that do not belong to any file, which are corrected by marking the block free in the allocation map; files and directories for which an inode is allocated and no directory entry exists (i.e., orphaned files), which are corrected by creating directory entries for these files in a lost+found subdirectory in the root directory; and directory entries that point to an inode that is not allocated, which is corrected by removing the directory entry; etc.

SUMMARY

According to one embodiment of the present invention, a method is provided that comprises: identifying inodes of a first group of files in a clustered file system based on a cyber-resiliency for the clustered file system; grouping the inodes based on a buffer size allocated to a FSCK (File System Consistency Check) operation for the clustered file system; and in response to the buffer size being greater than a total size of the inodes of the first group of files, passing the inodes of the first group of files to the FSCK operation in a single iteration.

According to one embodiment of the present invention, a system is provided that comprises: a processor; and a memory storing instructions that when executed by the processor enable performance of an operation that includes: identifying inodes of a first group of files in a clustered file system based on a cyber-resiliency for the clustered file system; grouping the inodes based on a buffer size allocated to a FSCK (File System Consistency Check) operation for the clustered file system; and in response to the buffer size being greater than a total size of the inodes of the first group of files, passing the inodes of the first group of files to the FSCK operation in a single iteration.

According to one embodiment of the present invention, a computer-readable storage medium is provided that includes instructions that when executed by a processor enable performance of operations including: identifying inodes of a first group of files in a clustered file system based on a cyber-resiliency for the clustered file system; grouping the inodes based on a buffer size allocated to a FSCK (File System Consistency Check) operation for the clustered file system; and in response to the buffer size being greater than a total size of the inodes of the first group of files, passing the inodes of the first group of files to the FSCK operation in a single iteration.

DETAILED DESCRIPTION

The present disclosure provides for the effective performance of online FSCK operations by assigning priorities to sets of identified files from a cyber-resiliency perspective for each container, identifying dependent files from an application orchestration perspective, and identifying passive container data in the container workload environment to control how FSCK is applied. Depending on the priority of a file that is identified as being corrupted, the file system manager determines when to perform an FSCK operation to thereby provide for more consistent up-time of the various services, and shorter downtimes, among other benefits.

Figure 1:
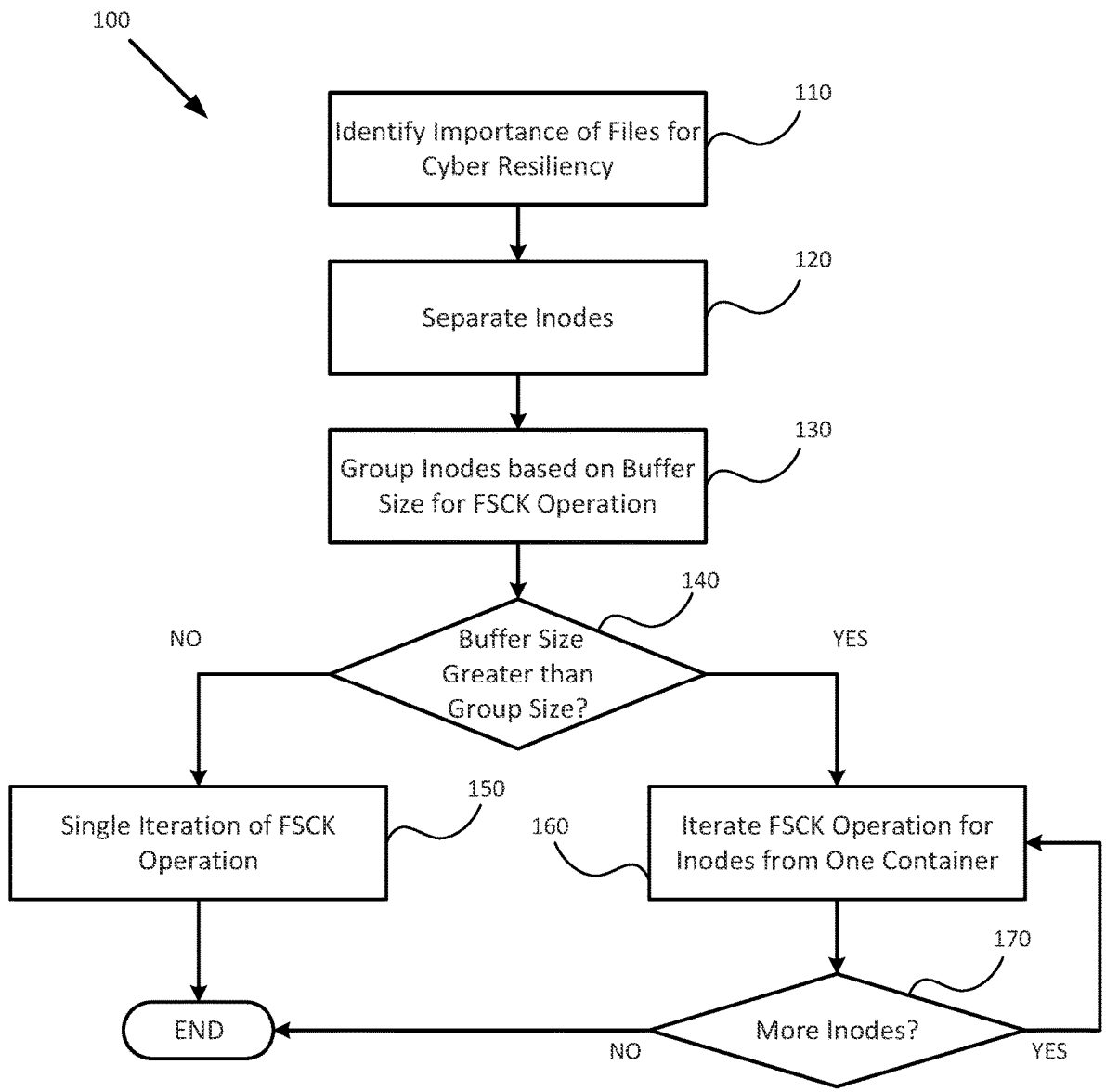
FIG. 1 is a flowchart of a method of effective FSCK, according to embodiments of the present disclosure

FIG. 1 is a flowchart of a method 100 of effective FSCK, according to embodiments of the present disclosure. Method 100 begins with block 110, where the file system manager identifies the files that are important to the file system in a cyber-resiliency perspective of each container. As used herein, cyber-resiliency refers to the ability of an entity to continuously deliver the intended outcome despite adverse cyber events. Entities with potential need of cyber resilience abilities include, but is not limited to: Information Technology (IT) systems, and critical infrastructure or software management systems. Adverse cyber events are those that negatively impact the availability, integrity or confidentiality of networked IT systems and associated information and services. These events may be intentional (e.g., cyber-attacks) or unintentional (e.g., failed software updates) and can be caused by humans or nature or a combination thereof.

Various files can have different levels of importance for cyber-resiliency. As used herein, files can be categorized as system configuration/Operating System (OS) files, or as user data. For example, a log file that is frequently overwritten, seldom read, and only access by a single container may be of low importance for cyber-resiliency, whereas a database file frequently read from and written to by several different containers may be of high importance for cyber-resiliency. Accordingly, a corruption in the example log file may go unnoticed (and unaddressed) without affecting the perceived reliability of the file system, while even a small error in the example database file may cause serious disruption if not discovered and addressed promptly.

The file system manager can identify various tiers of importance for the files vis-a-vis cyber-resiliency. As identified in Table 1, the file system manage may use any number of importance tiers for files with different needs for resiliency to cyber events. Although Table 1 provides an example with five priority level, other embodiments can use more or fewer priority levels, and can assign different levels to the identifies actions or identify different actions from what are illustrated in Table 1.

TABLE 1

| Identified Action | Priority Level |
| --- | --- |
| Input Data Files used by containers | 1 |
| Output files or temporary files produced and consumed within one container | 3 |
| Output files or temporary files produced and consumed across different containers | 2 |
| Files sufficient to reconstruct pipeline | 1 |
| Files mostly read or overwritten by single container | 3 |
| Files stored with immutable tagged volume | 4 |
| Files associated with rapid generation or updates across containers | 2 |
| Files accessed by at least a threshold number of containers | 2 |
| Files with read and update/overwrite operations performed thereon across containers | 2 |
| Files with created or written to across containers | 4 |
| Files related to passive containers | 3 |
| Other files | 5 (no priority) |

By identifying various priorities for the cyber-resiliency of different files, the file system manager is better able to maintain the ability of an entity to continuously deliver the intended services, even when regular delivery mechanisms fail, such as during a crisis or a security breach. This functionality also extends the ability to restore regular delivery mechanisms after such events as well as the ability to continuously change or modify these delivery mechanisms if needed to face new risks. Backups and disaster recovery operations are part of the process of restoring delivery mechanisms, and knowing which files are the most important for restoration allows the file system manager to be selective in when and how FSCK operations are performed.

Figure 2:
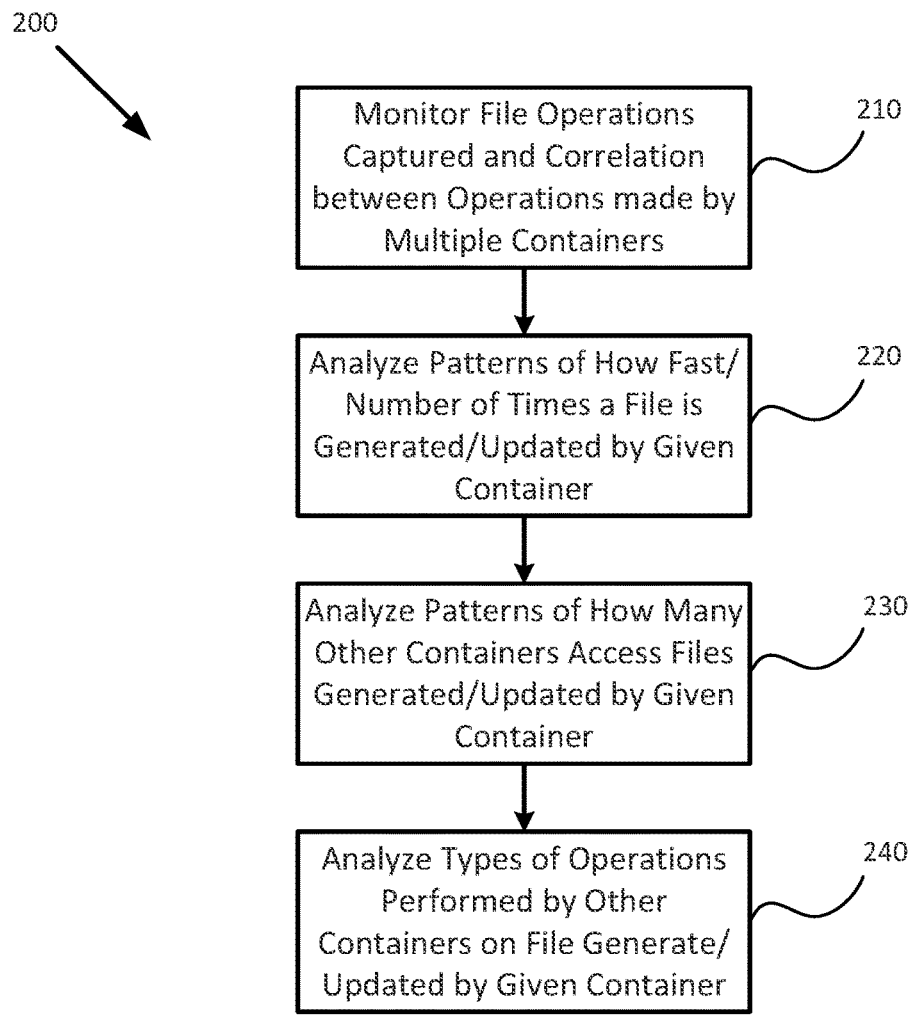
FIG. 2 is a flowchart of a method of identifying file operation correlation based on container interactions, according to embodiments of the present disclosure.

Unlike rankings for file importance via an orthogonal namespace, separate inode (index node) table, or other data structure (e.g., databases, repositories, metadata or inode fields, header information, orchestration layers), the presently described framework identifies file importance levels on a per container basis. For example, when the file system manager considers file access rate as a measure for determining a priority level for a file, a file than is accessed X times is generally marked as less important than a file accessed 2× times. However, the most accessed file may not be important in the context of cyber resiliency from the perspective of a given container. Additionally, using a framework where applications indicate file importance with a distinguished metadata field draws unnecessary attention to the file (e.g., alerting ransomware attackers or hackers), and thus important can become easy targets for data theft. The proposed framework, however, parses the storage write log, records the host details along with the inodes access and prepares a map of the container hosts vs. accessed inodes with specific information of the action taken (e.g., read, write, update, etc.). The file system manager of the present disclosure analyses the files in each category, identifies the priority levels of the files, find their inodes and group them according to container host. Method 200, described in relation to FIG. 2, provides additional detail on how the file system manager identifies the importance of various files.

At block 120, the file system manager separates the inodes of the files from the rest of the file. Inodes are data structures that describe the metadata (e.g., times of last change, access, modification), owner/permission data, and disk block locations of the data of the associated file.

At block 130, the file system manager groups the inodes based on the buffer size allocated for the FSCK operation. In various embodiments, depending on the priority level of the FSCK operation selected by the file system manager, the file system manager groups all or a subset of the inodes. For example, when a low priority FSCK operation is identified, the file system manger can group only the most important inodes (e.g., those inodes that are associated with priority level 1 files, but not priority level 2-n files). In another example, when a medium priority FSCK operation is identified, the file system manager can group all but the least important inodes (e.g., those inodes that are associated with priority level 1-3 files, but not priority level 4-n files).

At block 140, the file system manager determines whether the buffer size is greater than the size of the group of inodes identified in block 130. For example, if the group of inodes is X bytes in size and the buffer for performing FSCK operations is Y bytes in size, method 100 proceeds to block 150 when X≤Y and proceeds to block 160 when X>Y.

At block 150, the file system manager loads the group of inodes to the buffer for FSCK operations, and performs the FSCK operation in a single iteration. Method 100 may then conclude.

At block 160, the file system manager loads the inodes from one container to the buffer for FSCK operations, and performs one iteration of the FSCK operation. Method 100 then proceeds to block 170, where the file system manager determines whether more inodes from the group identified in block 130 remain to be processed by the FSCK operation. When more inodes remain, method 100 returns to block 160 to perform a subsequent iteration of the FSCK operations. When no more inodes remain, method 100 may conclude.

FIG. 2 is a flowchart of a method 200 of identifying file operation correlation based on container interactions, according to embodiments of the present disclosure. In various embodiments, method 200 is performed as part of block 110 of method 100, described in greater detail in relation to FIG. 1.

At block 210, the file system manager monitors file operations captured in the inodes (e.g., read, write, create, etc.) and correlates which files are associated with operations made by multiple containers. For example, when a first container performs a create operation for a file, but a second container performs a read operation on that file. Additionally, the file system manager can identify the types of data held by the files so that files containing a larger number of metadata fields are identified and are treated with moderate priority (since these could be treated as important source of information for analytics).

At block 220, the file system manager analyzes patterns in the inodes for how fast or how often a file is generated or updated by a given container. For example, a first container can generate a first log file (overwriting or replacing a previous version of the first log file) every X minutes (on average), and can generate a second log file every Y minutes (on average). The file system manager uses these patterns to assign higher priorities to files that are overwritten less frequently. For example, files that are mostly read, overwritten, or updated by a single container are treated with moderate priority, whereas files that tagged as immutable are treated with low priority.

At block 230, the file system manager analyzes patterns for how many other containers (i.e., different containers than the given generating/updating container) access the files generated by the given container. For example, a first container that generates a first log file and a second log file can provide access to those files to a second container and a third container. The file system manager observes the frequency of access of the second and third containers to the first and second log files to identify that the first log file is accessed by (e.g., read from, written to, or both) both the second container and the third container, whereas only the second container accesses the second log file. Additionally or alternatively, the file system manager observes that the first log file is accessed by another container (e.g., either of the second or third containers) every X minutes (on average) and the second log file is accessed by another container every Y minutes (on average). The file system manager uses these patterns to assign higher priorities to files that are accessed more frequently than files that are accessed less frequently and to assign higher priorities to files that are accessed by more containers than files accessed by fewer containers.

At block 240, the file system manager analyzes the types of operations performed by the other containers on the files generated by the given container. For example, a second container can read data from, write data to, append data to, or copy a file created by the given container. The file system manager assigns higher priorities to files subject to read, update, and overwrite than to files that are subject to creation or new write operations. In various embodiments the files needed for reconstructing a data processing pipeline in case of site recovery or cyber-attack are identified based on correlating the outputs produced by one container that are consumed by other containers in the application orchestration to treat such files with high priority (e.g., level two) for FSCK processing.

Each of blocks 210-240 are performed in relation to one another to allow the different prioritization schemas to define the priority level for a given file. For example, output files written or tmp (temporary) files produced per container are identified, and the priority level of these files may be dependent on whether these files produced are needed to reconstruct pipeline or are otherwise used as input for a more-important file. When used by a higher priority file in the same container, the file system manager may assign the output file high priority, or a moderate priority if used by another container, but a low priority if the output file is not used by another process.

Figure 3:
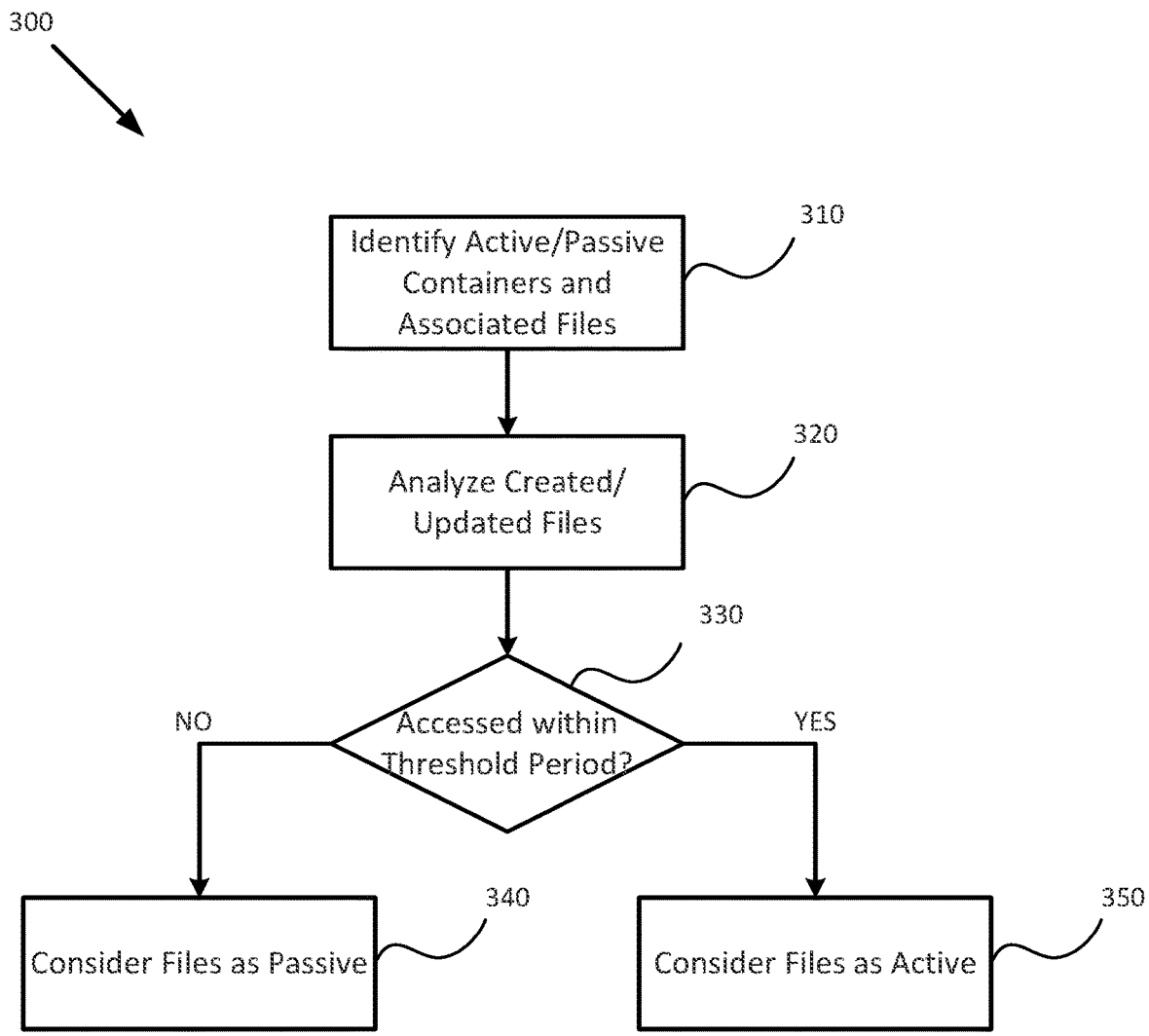
FIG. 3 is a flowchart of a method of priority identification based on the container access pattern of the associated files, according to embodiments of the present disclosure.

FIG. 3 is a flowchart of a method 300 of priority identification based on the container access pattern of the associated files, according to embodiments of the present disclosure. For example, when various spinned containers belonging to an established enterprise access a refined (organized) data store or repository, the orchestrated workloads may only selectively access portions of the data. Accordingly, method 300 allows the file system manager to identify and mark the importance for cyber resiliency of those files based on how the various spinned containers access the files on a per container basis. In various embodiments, method 300 may be performed as part of method 100 (discussed in relation to FIG. 1) or as part of method 200 (discussed in relation to FIG. 2) when determining the importance of the various file for cyber resiliency. For example, SAP (Systems Application and Products) modules are orchestrated with full access to enterprise data stores, and the functionality of these modules are served by multiple containers, which use each of the analyses per blocks 212-240 to decided priority levels for. In a scenario in which a first application configured in a first container reads only a first type of files (e.g., spreadsheet files) and a second application configured in a second container reads only data files of a second type (e.g., inputs read by the first type of files), the files accessed by the first container are marked as high priority for FSCK scan from a cyber-resiliency perspective for the first container and the data files accessed by the second container are marked as high priority for FSCK scan from cyber resiliency perspective in general (or either container's perspective).

At block 310, the file system manager identifies the active and passive containers and the associated files for those containers.

At block 320, the file system manager identifies when the files associated with the various containers were last updated, or when the file was created to identify a time of last access by that container.

At block 330, the file system manager identifies whether a given file was last accessed within a configurable period of time. In various embodiments, the configurable period of time is a threshold that is set by an administrative user or that is dynamically determined based on enterprise usage rates (e.g., different thresholds during working hours versus over holidays, weekends, or non-business hours for an enterprise).

In response to the time of last access being outside of the threshold, method 300 proceeds to block 340, where the file system manager marks the files associated with passive containers as lower priority.

In response to the time of last access being at or within the threshold, method 300 proceeds to block 350, where the file system manager marks the files associated with active containers as normal or no priority.

Figure 4:
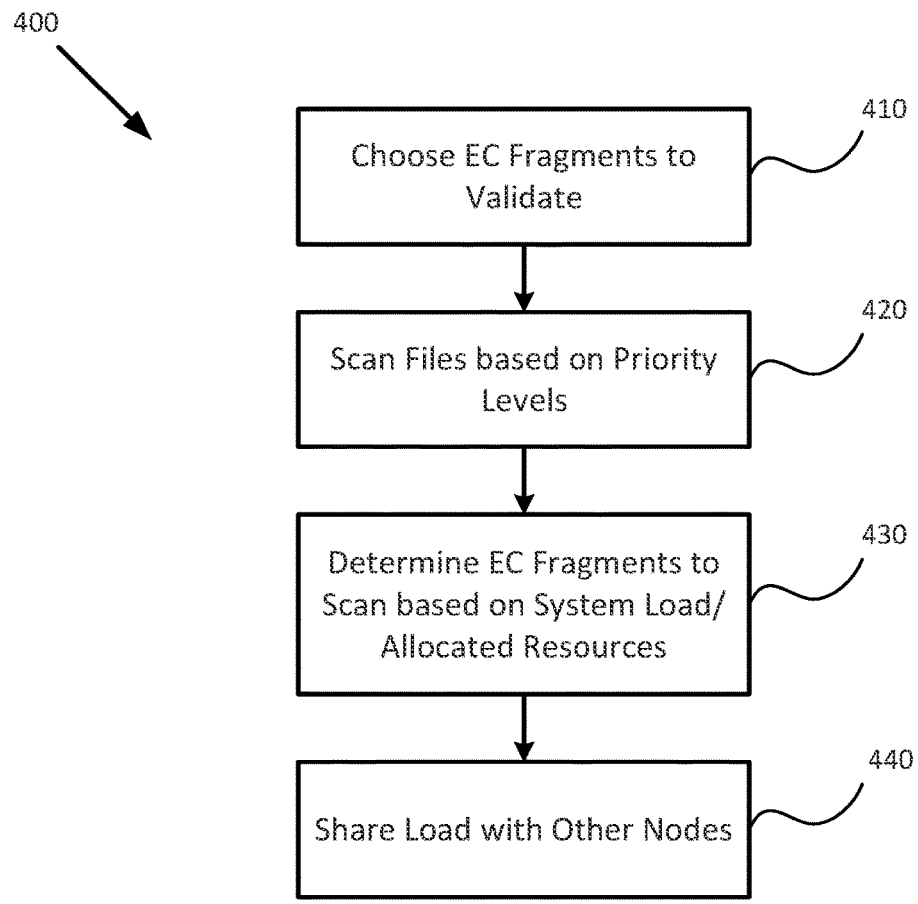
FIG. 4 is a flowchart of a method of dynamically identifying EC Erasure Code fragments to scan first based on the priority and system load, according to embodiments of the present disclosure.

FIG. 4 is a flowchart of a method 400 of dynamically identifying EC (Erasure Code) fragments to scan first based on the priority and system load, according to embodiments of the present disclosure. In various embodiments, method 400 is performed at part of method 100 (e.g., blocks 150 or 160 as discussed in relation to FIG. 1) to determine which nodes to scan in a given iteration of an FSCK operation.

At block 410, the file system manager chooses a number EC fragments to validate for each file. In various embodiments, the number of fragments to be validated in a given iteration can be dynamically chosen. For example, in the FSCK operation can choose to validate between a minimum and a maximum number of fragments of each identified file (or lower priority files if sufficient buffer space exists). In an 8+3p EC schema, between 8 and 11 (i.e., 8+3) fragments can be analyzed for each file depending on the administrator policies and available buffer space.

At block 420, the file system manager scans files based on the priority levels of those files (e.g., as assigned per method 100, discussed in relation to FIG. 1). The file system manager identifies the most important files from the perspective of cyber-resiliency to scan first so that higher priority files are scanned before lower priority files, and files below a priority threshold (e.g., assigned no priority) are not scanned. When At block 430, the file system manager determines the EC fragments to scan based on the system load and allocated resources for scan. When all of the files of a container (or group of containers) are marked for scan, dependent scan operations are completed first, then priority is provided to scanning any left-out (i.e., not yet scanned) parity fragments of the dependent files.

At block 440, the file system manager shares the load with other nodes. The file system manager re-distributes the workload among the nodes when necessary to improve the FSCK operation and more fully use the available resources to complete FSCK operations faster and use system resources more efficiently.

Figure 5:
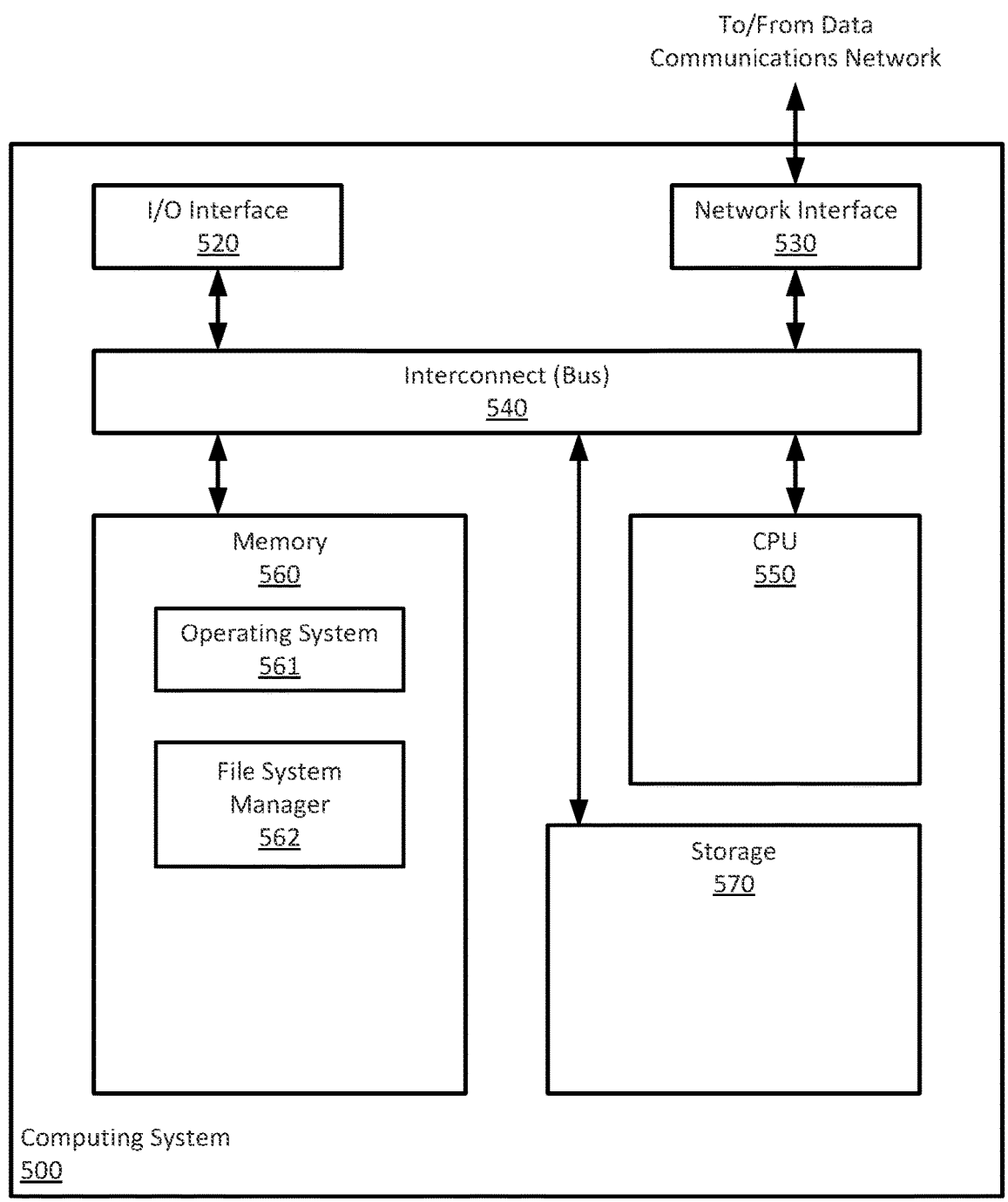
FIG. 5 illustrates a computing system, according to embodiments of the present disclosure.

FIG. 5 illustrates a computing system 500, according to embodiments of the present disclosure. As shown, the computing system 500 includes, without limitation, a central processing unit (CPU) 550, a network interface 530, an interconnect 540, a memory 560, and storage 570. The computing system 500 may also include an I/O device interface 520 connecting I/O devices 510 (e.g., keyboard, keypad, display, touchscreen, biometric scanner, and mouse devices) to the computing system 500.

The CPU 550 retrieves and executes programming instructions stored in the memory 560. Similarly, the CPU 550 stores and retrieves application data residing in the memory 560. These instructions are included in an instruction cache 551 for execution and manipulation as described in the present disclosure. The interconnect 540 facilitates transmission, such as of programming instructions and application data, between the CPU 550, I/O device interface 520, storage 570, network interface or other interconnect 540, and memory 560. CPU 550 is included to be representative of a single CPU, a microprocessor, multiple CPUs, a single CPU having multiple processing cores, and the like. And the memory 560 is generally included to be representative of a random access memory. The storage 570 may be a disk drive storage device. Although shown as a single unit, the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 530 (e.g., cloud storage).

Further, although shown as a single computing system, one of ordinary skill in the art will recognized that the components of the computing system 500 shown in FIG. 5 may be distributed across multiple computing systems connected by a data communications network.

As illustrated, the memory 560 includes an operating system 561, which may include one or more file systems, and a set of processor instructions to perform various actions as described herein. These actions may be informed and formatted according to various applications, such as the file system manager 562, running in the memory as instructions executed by the CPU 550.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
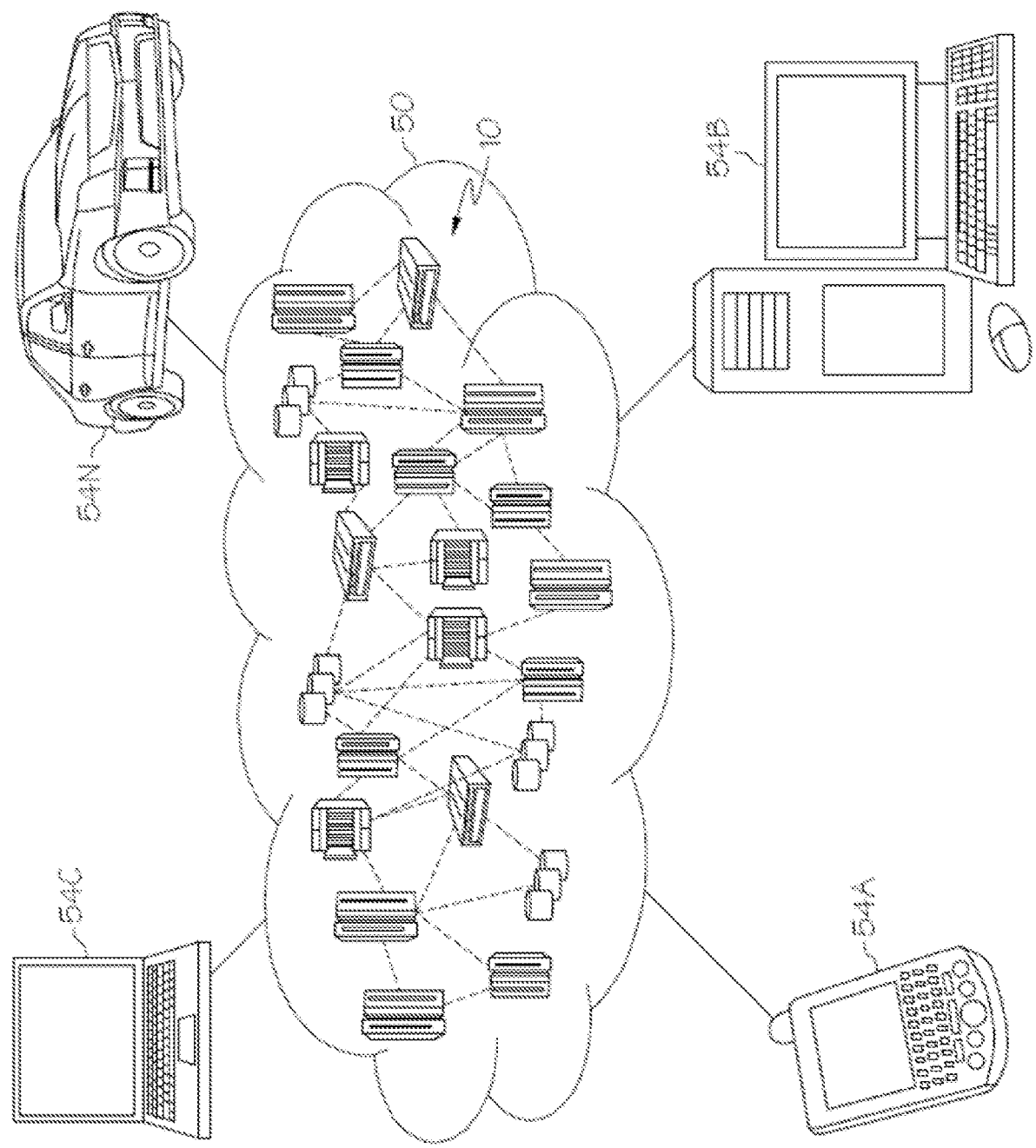
FIG. 6 depicts a cloud computing environment, according to embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
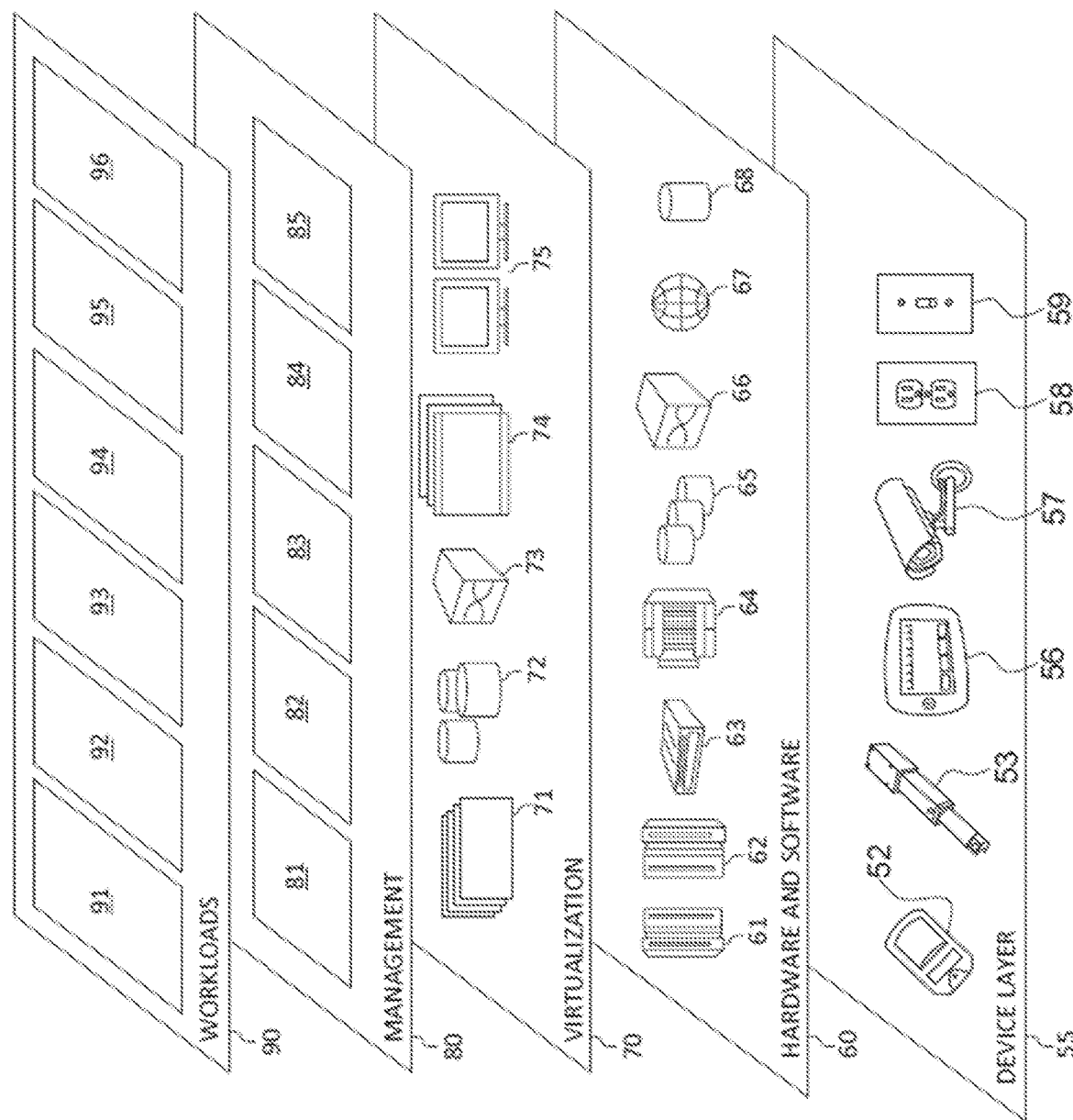
FIG. 7 depicts abstraction model layers, according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
identifying inodes of a first group of files in a clustered file system based on a cyber-resiliency for the clustered file system;
grouping the inodes based on a buffer size allocated to a FSCK (File System Consistency Check) operation for the clustered file system;
in response to the buffer size being greater than a total size of the inodes of the first group of files, passing the inodes of the first group of files to the FSCK operation in a single iteration;
in response to the buffer size being less than a total size of the inodes of a second group of files:
identifying the inodes of the second group of files that belong to a first container and that belong to a second container;
passing the inodes of the second group of files that belong to the first container to the FSCK operation in a first iteration; and
passing, after the first iteration completes, the inodes of the second group of files that belong to the second container to the FSCK operation in a second iteration.

2. The method of claim 1, further comprising:
identifying the second group of files in the clustered file system based on the cyber-resiliency for the clustered file system;
separating inodes of the second group of files; and
grouping the inodes of the second group of files based on the buffer size allocated to the FSCK operation for the clustered file system.

3. The method of claim 1, wherein identifying the first group of files in the clustered file system identifies the files that are important to the cyber-resiliency of the clustered file system further comprises:
monitoring file operations captured;
analyzing frequency patterns for how often the files are generated or updated by a given container;
analyzing access patterns of how many other containers, besides the given container, access the files; and
analyzing operational patterns for what types of operations are performed on the files by the other containers.

4. The method of claim 1, wherein identifying the first group of files in the clustered file system identifies the files that are important to the cyber-resiliency of the clustered file system further comprises:
analyzing a time of last access for a given file; and
marking as the given file as one of passive or active based on whether the time of last access is within a threshold.

5. The method of claim 1, further comprising:
selecting a number of Erasure Code (EC) fragments to validate for each of the files passed to the FSCK operation; and
scanning the files based on priority levels of the files.

6. The method of claim 5, wherein the number of EC fragments are dynamically selected based on system load and resources allocated to the FSCK operation.

7. The method of claim 1, wherein the first group of files consists of files assigned a priority level above a priority threshold for cyber-resiliency for the clustered file system.

8. A system, comprising:
a processor; and
a memory storing instructions that when executed by the processor enable performance of an operation that includes:
identifying inodes of a first group of files in a clustered file system based on a cyber-resiliency for the clustered file system;
grouping the inodes based on a buffer size allocated to a FSCK (File System Consistency Check) operation for the clustered file system;
in response to the buffer size being greater than a total size of the inodes of the first group of files, passing the inodes of the first group of files to the FSCK operation in a single iteration;
in response to the buffer size being less than a total size of the inodes of a second group of files:
identifying the inodes of the second group of files that belong to a first container and that belong to a second container;
passing the inodes of the second group of files that belong to the first container to the FSCK operation in a first iteration; and
passing, after the first iteration completes, the inodes of the second group of files that belong to the second container to the FSCK operation in a second iteration.

9. The system of claim 8, wherein the operation further includes:
identifying the second group of files in the clustered file system based on the cyber-resiliency for the clustered file system;
separating inodes of the second group of files; and
grouping the inodes of the second group of files based on the buffer size allocated to the FSCK operation for the clustered file system.

10. The system of claim 8, wherein identifying the first group of files in the clustered file system identifies the files that are important to the cyber-resiliency of the clustered file system further comprises:
monitoring file operations captured;
analyzing frequency patterns for how often the files are generated or updated by a given container;
analyzing access patterns of how many other containers, besides the given container, access the files; and
analyzing operational patterns for what types of operations are performed on the files by the other containers.

11. The system of claim 8, wherein identifying the first group of files in the clustered file system identifies the files that are important to the cyber-resiliency of the clustered file system further comprises:
analyzing a time of last access for a given file; and
marking as the given file as one of passive or active based on whether the time of last access is within a threshold.

12. The system of claim 8, further comprising:
selecting a number of Erasure Code (EC) fragments to validate for each of the files passed to the FSCK operation; and
scanning the files based on priority levels of the files.

13. The system of claim 12, wherein the number of EC fragments are dynamically selected based on system load and resources allocated to the FSCK operation.

14. The system of claim 8, wherein the first group of files consists of files assigned a priority level above a priority threshold for cyber-resiliency for the clustered file system.

15. A computer-readable storage medium including instructions that when executed by a processor enable performance of operations including:
  identifying inodes of a first group of files in a clustered file system based on a cyber-resiliency for the clustered file system;
  grouping the inodes based on a buffer size allocated to a FSCK (File System Consistency Check) operation for the clustered file system; and
  in response to the buffer size being greater than a total size of the inodes of the first group of files, passing the inodes of the first group of files to the FSCK operation in a single iteration;
  in response to the buffer size being less than a total size of the inodes of a second group of files:
    identifying the inodes of the second group of files that belong to a first container and that belong to a second container;
    passing the inodes of the second group of files that belong to the first container to the FSCK operation in a first iteration; and
    passing, after the first iteration completes, the inodes of the second group of files that belong to the second container to the FSCK operation in a second iteration.

16. The computer-readable storage medium of claim 15, wherein the operations further include:
  identifying the second group of files in the clustered file system based on the cyber-resiliency for the clustered file system;
  separating inodes of the second group of files; and
  grouping the inodes of the second group of files based on the buffer size allocated to the FSCK operation for the clustered file system.

17. The computer-readable storage medium of claim 15, wherein identifying the first group of files in the clustered file system identifies the files that are important to the cyber-resiliency of the clustered file system further comprises:
  monitoring file operations captured;
  analyzing frequency patterns for how often the files are generated or updated by a given container;
  analyzing access patterns of how many other containers, besides the given container, access the files; and
  analyzing operational patterns for what types of operations are performed on the files by the other containers.

18. The computer-readable storage medium of claim 15, wherein identifying the first group of files in the clustered file system identifies the files that are important to the cyber-resiliency of the clustered file system further comprises:
  analyzing a time of last access for a given file; and
  marking as the given file as one of passive or active based on whether the time of last access is within a threshold.

19. The computer-readable storage medium of claim 15, further comprising:
  selecting a number of Erasure Code (EC) fragments to validate for each of the files passed to the FSCK operation; and
  scanning the files based on priority levels of the files.

20. The computer-readable storage medium of claim 19, wherein the number of EC fragments are dynamically selected based on system load and resources allocated to the FSCK operation.

* * * * *